Figure 1:
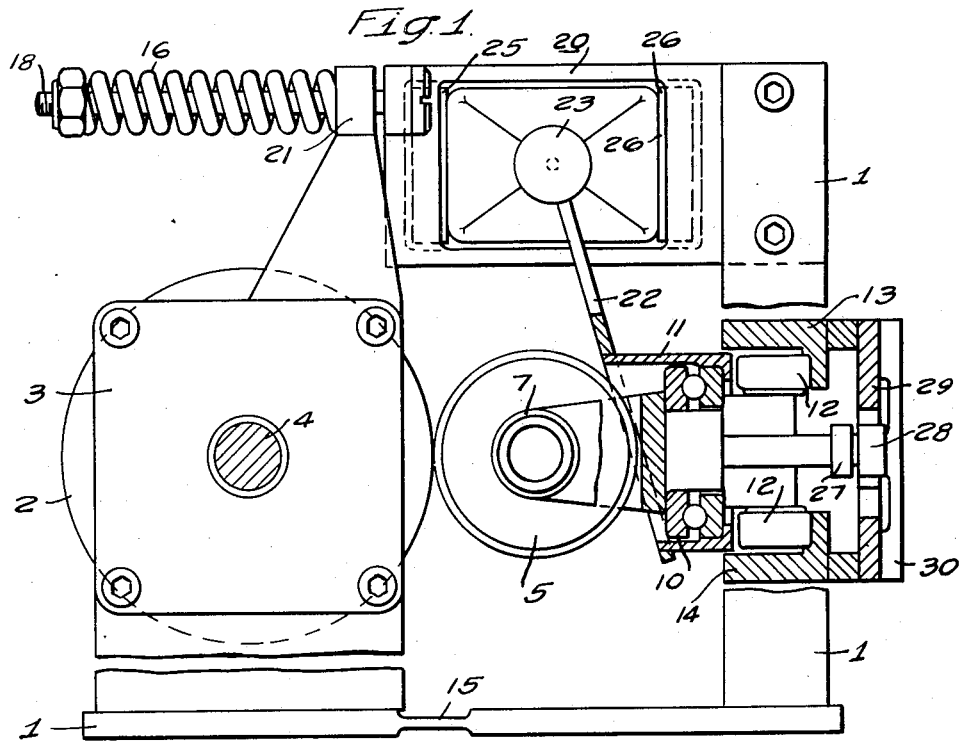

July 19, 1949.  C. R. HANNA ET AL  2,476,861
FRICTIONAL SERVOMOTOR

Filed Nov. 29, 1947  3 Sheets-Sheet 1

WITNESSES:

INVENTORS
Clinton R. Hanna
and Stanley J. Mikina.
BY
ATTORNEY

July 19, 1949.  C. R. HANNA ET AL  2,476,861
FRICTIONAL SERVOMOTOR

Filed Nov. 29, 1947  3 Sheets-Sheet 2

WITNESSES:

INVENTORS
Clinton R. Hanna and
Stanley J. Mikina
BY
ATTORNEY

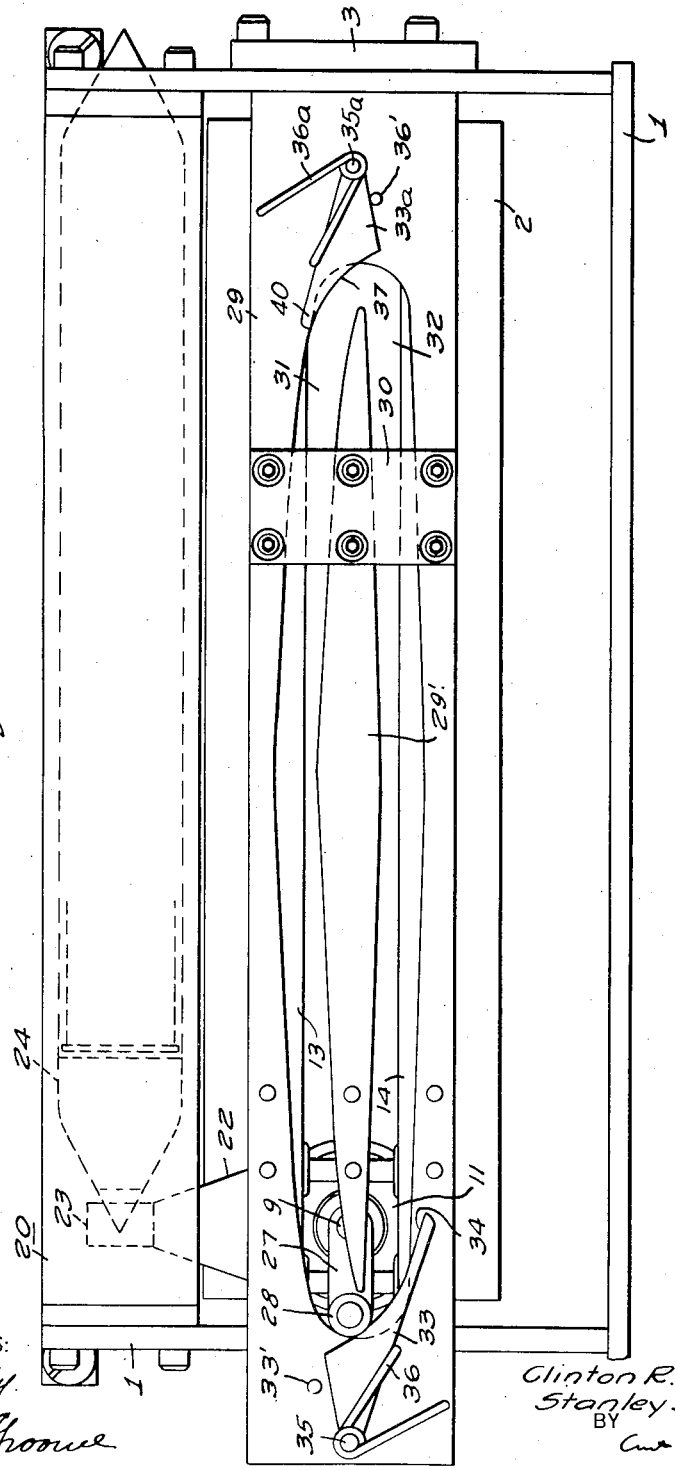

Patented July 19, 1949

2,476,861

UNITED STATES PATENT OFFICE 2,476,861

FRICTIONAL SERVOMOTOR

Clinton R. Hanna and Stanley J. Mikina, Pittsburgh, Pa., assignors to Westinghouse Electric Corporation, East Pittsburgh, Pa., a corporation of Pennsylvania Application November 29, 1947, Serial No. 788,866

6 Claims. (Cl. 139—142)

Our invention relates to frictional mechanisms which transform rotary motion into translational motion of controllable velocity, acceleration, or extent of travel for positioning, regulating and the like control purposes or for the purpose of power transmission or propulsion. Such mechanisms are disclosed in Patent No. 2,428,807 and in the copending patent application Serial No. 788,346, filed November 28, 1947, now Patent No. 2,473,896, June 21, 1949; and the present invention consists essentially in improvements relating to mechanisms as dealt with in those previous disclosures.

In such mechanisms, an elongated rotor, revolving about its geometric axis preferably at constant speed, is frictionally engaged by a roller which is mounted on a movable carrier to impart translational movement to the carrier when the roller axis is turned out of parallelism with the generatrix of the rotor; and a control device serves to turn the roller axis back to the parallel position as the carrier advances along its path of travel.

It is an object of our invention to devise frictional translating mechanisms or servomotors of the above-mentioned type that permit providing desired laws of speed or acceleration of the translational motion so that the law governing the forward motion is not necessarily fixed by that of the return motion.

Another object of the invention is to provide mechanisms of the type referred to which are self-controlled as regards the reversal of the translational movement so that only one control impulse, applied from an extraneous source, is necessary to start the translational stroke in one direction while at the end of the stroke the mechanism operates automatically, i. e., without requiring another control action from an extraneous source, to perform a return stroke.

Another object of our invention is to provide mechanisms which are self-controlled as regards operation in both directions of translational travel so that the travelling member shuttles back and forth without requiring the application of extraneously governed control or release impulses.

In order to achieve these objects and in accordance with our invention, we provide the pivot structure of the friction roller with a crank or the like follower member alternately engaged by two cam faces which extend along the path of translational travel, and we control the angular movement of the roller pivot during the forward and return strokes respectively, by two control members, located near the respective ends of translational travel, which switch the follower member from one to the other cam surface.

These and other objects and features of the invention will be apparent from the embodiment illustrated in the drawing.

The illustrated servo mechanism is designed as a drive for the fly shuttle of a weaving loom. Fig. 1 shows a part-sectional view in the axial direction of the driving rotor, Fig. 2 a view taken from the right-hand side of Fig. 1, and Fig. 3 a top view relative to Fig. 1. Fig. 4 is a sectional view of carriage and friction roller, and Fig. 5 shows the control device for turning the pivot of the friction roller.

In the drawings, numeral 1 denotes a composite stationary frame or supporting structure. A rotor 2 of elongated cylindrical shape is revolvably mounted in bearing plates 3 of the frame structure. The shaft 4 of rotor 2 is connected to an electric drive motor (not shown) operating substantially at constant speed. The rotor 2 is maintained in continuous revolution during the operating period of the weaving loom. Held against the cylindrical surface of the rotor is a friction roller 5. Roller 5 is mounted on a ball bearing 6 whose hub portion is seated on a hollow shaft 7 (Fig. 4). As shown, the roller 5 consists of the outer race member of the ball bearing which has a normal design, except that its outer surface is ground to a slight curvature to reduce the starting torque required to tilt the roller. The roller shaft 7 is attached to a fork-shaped supporting member 8. Integral with this member is a pivot shaft 9. The axis of pivot shaft 9 extends at a right angle to the geometrical axis of rotor member 2. The axis of revolution of the roller 5, i. e., the geometrical axis of hollow shaft 7, extends at a right angle to the axis of pivot shaft 9.

Shaft 9 is journalled in a thrust bearing 10. Bearing 10 rests against a carriage structure 11 equipped with four ball-bearing wheels, all denoted by 12. The wheels engage two rails 13 and 14 that are firmly attached to the frame structure 1 and extend along the rotor 2 in parallel to the rotor axis. The frame structure has a weakened or hinge-like portion, at 15 (Fig. 1), capable of permitting movement of bearing plates 3 and rotor 2 toward the carriage structure. Two helical compression springs 16 and 17 secure the necessary frictional engagement between rotor 2 and roller 5 while forcing the carriage wheels against the rails 13 and 14. Springs 16 and 17 are disposed on threaded bolts 18 and 19, respectively. The bolts are anchored in a shuttle box structure 20 that is mounted on the frame structure to form a rigid part thereof. One end of each spring rests against a bracket 21 of the appertaining rotor bearing plate 3. The other spring end abuts against an adjusting unit seated on bolt 18 or 19. The machined hinge portion 15, as shown, is preferably located at the base of a vertical line (Fig. 1) through the point of application of the spring force on the shuttle box 20 and the point of contact of roller 5 with rotor 2.

It will be recognized that the springs 16 and 17, as compared with the biasing mechanisms disclosed in the above-mentioned patent, are not disposed on the carriage 11 so that the carriage structure can be given a greatly simplified design of considerably reduced weight or mass. As a further result, the spring force can readily be adjusted without requiring a removal or disassembly of the carriage.

Attached to the carriage structure 11 is a member 22 that carries a metal cup 23 for engaging the fly shuttle 24 to be propelled by the mechanism. The cup 23 also serves to bring the shuttle to a stop on its return from the other side of the loom. The returning shuttle is braked when it enters the shuttle box 20 by wedging itself between spring-backed friction shoes 25, 26 (Fig. 1) extending the length of the shuttle box 20. Cup 23 is filled with rawhide or other suitable resilient material to be engaged by the steel-tipped nose of the shuttle.

When the axis of revolution of friction roller 5 is in the illustrated position of parallelism with the generatrix of rotor 2, the revolution of the rotor has merely the effect of revolving the roller 5 but imparts no driving force to the carriage structure 11. When shaft 9 is turned, thereby twisting the roller axis relative to the generatrix of rotor 2, the carriage assembly is propelled along the rails at a velocity substantially equal to the peripheral velocity of the rotor times the tangent of the angle through which shaft 9 has turned. In order to impart high translational acceleration to the carriage or shuttle, for instance in the order of 100 times gravity, the angular adjustments of the shaft 9 must be accurately controlled within short intervals of time. For example, in a specific loom shuttle drive, the shuttle is uniformly brought up to a speed of 45 feet per second within about 1/50 second at the end of 6 inches of travel. From this point on, the carriage begins a uniform deceleration that brings it to a stop in another 6 inches of travel, while the shuttle travels under its own momentum to the other side of the loom. The means for securing a control of this kind will be described presently.

The pivot shaft 9 carries an arm or the like crank member 27 whose actuating end is equipped with a roller 28 to engage the cam faces of a cam device (Figs. 1, 3, 4, 5). The cam device has a cam plate 29 firmly secured to the frame structure 1 and has two grooved slots which extend along the rotor 2 and along the path of travel of carriage 11. While the cam plate may consist of a single piece, the one shown in the embodiment has a separate center piece 29' firmly attached to the outer part of plate 29 by means of two bridging pieces of which one is shown in Fig. 5 at 30 while the other, in the same figure, is assumed to be removed in order to expose other parts of the mechanism. The edges of the upper cam slot 31 and the edges of the lower slot 32 (Fig. 5) form the cam faces which are engaged by the roller 28 during the forward and return travel respectively of the carriage. The two slots communicate with each other at both ends so as to form a continuous guiding groove for the roller 28 (cam follower).

A switching member 33, whose control surface 34 projects into the path of the roller 28, is pivotally mounted about a pin 35 on the cam plate 29 near one end of the two cam slots. A spring 36, engaging the member 33 and attached to the plate 29, biases the switch member 33 toward engagement with a stationary stop 33'. A similar switch member 33a with a control surface 37 is pivoted at 35a near the other end of the cam slots and is biased by a spring 36a toward engagement with a stationary stop 36'.

Figure 2:
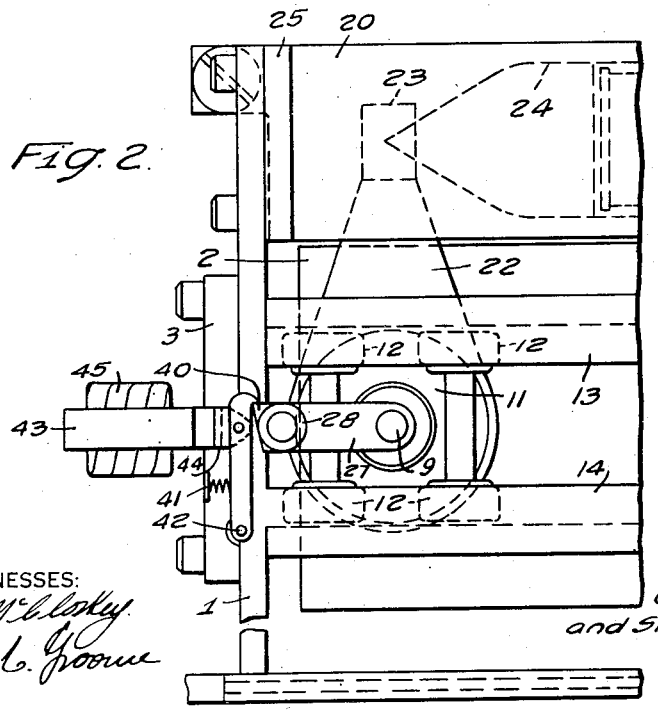
Figure 3:
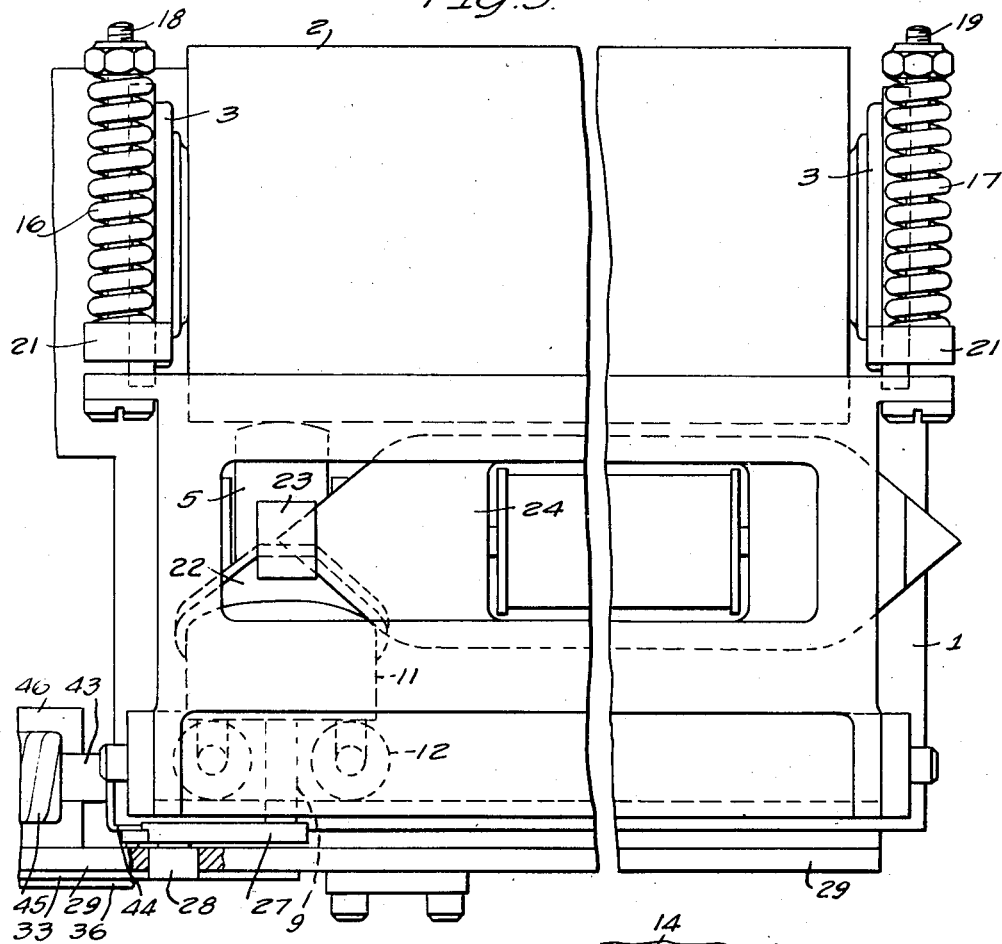
Figure 4:
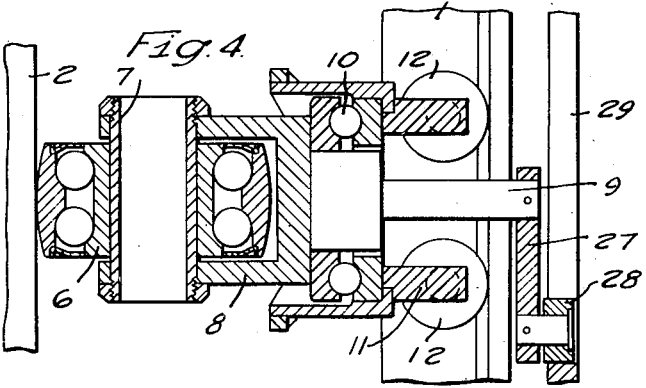

The crank arm 27 forms a nose at 40 (Fig. 2) for engagement with a latch 41 which is pivoted at 42 on the frame structure 1 and linked to a magnetic core member 43 by means of an angle member 44 (Figs. 2 and 3). A solenoid coil 45, mounted on a magnetic field structure 46, serves to control the core 45 so that when the coil 45 is energized, the latch 41 is released from the nose 40 of crank arm 27.

The upper groove or slot 31 controls the carriage motion in the forward direction, i. e., from left to right in Fig. 5. The shape of groove 31 as illustrated in Fig. 5 is calculated to impart a constant acceleration to the carriage during the first half of the forward travel, followed by a constant deceleration of the carriage in the second half of the forward stroke.

When the carriage comes close to the end of its forward stroke, the roller 28 begins to engage the control surface 37 of switch member 33a and moves this member clockwise in opposition to the biasing spring 36a. Due to the action of the spring, the member 33a forces the roller 28 downward into engagement with the lower cam slot 32, whose function it is to control the carriage motion during the return part of its cycle. The carriage can be returned to its starting point at a reduced velocity, if desired, depending upon the selected shape and disposition of the lower cam slot.

When the carriage is close to the end of its return stroke, the roller 28 engages the cam surface of switching member 33 and moves it downward against the force of the biasing spring 36. Thus, at the end of the return stroke when the arm 27 is again horizontal and the carriage stationary, the switch member 33 is exerting an upward force. However, the arm 14 is locked in this horizontal position by the latch 41 which is spring biased toward the arm 27 (Fig. 2). Consequently, the arm 27 remains in horizontal position in which the friction roller 5 has the position shown in Figs. 1, 3 and 4 so that the carriage remains at rest in the illustrated position. When the instant for propulsion of the shuttle is reached in the operating cycle of the weaving loom, the latch 41 is pulled away from the arm 27 by an electric impulse transmitted by some suitable control circuit (not illustrated) to the solenoid 45. The spring-biased switch member 33 is then effective to move the roller 28 upward with the result of starting the carriage on its forward stroke. Arm 27 need be turned only to a slight extent by the switching member 33 because the immediate response of the carriage in the form of a translational motion to the right (in Fig. 5) steers the roller 28 positively into the upper cam slot.

If desired, a separately controllable latching device corresponding to the elements 40 through 46 may also be disposed near the other end of the translational travel so that both the forward stroke and the return stroke are to be initiated by control impulses depending upon the operating cycle of the associated machinery. On the other hand, the latching device may be omitted, or the latch 41 may be held in disengaged position so that then the mechanism is completely self-controlled to continuously reciprocate its carriage. It will be understood that if latching devices are employed, these devices may be operated by other than electromagnetic means, for instance, by a mechanical transmission or by a hydraulic control system.

Although the frictional servomotor specifically described in the foregoing and shown in the drawings is designed as a shuttle drive for weaving looms, it is apparent that the invention can likewise be embodied in mechanisms for other purposes, such as the propulsion or control of torpedoes, aircraft, gun control systems, and, in general, in servo-mechanisms for which an aperiodic or non-oscillatory response is desirable.

It should also be understood that while I have illustrated and specifically described a mechanism whose driving rotor is cylindrical, the rotor may be given conical shape or generally the shape of a body of revolution. It will be obvious to those skilled in the art upon study of this disclosure that the invention permits various modifications, embodiments, and applications, other than those specifically mentioned, within the gist and principles of my invention and without departure from the essential features of the invention set forth in the claims annexed hereto.

We claim as our invention:

1. A device for deriving translational motion from a source of rotary power, comprising a rotor revolvable about its geometric axis, a structure movable along said rotor, a pivot revolvably mounted on said structure, a roller in frictional engagement with said rotor and revolvably mounted on said pivot so that the axis of roller revolution extends at a right angle to the axis of said pivot, a cam follower member attached to said pivot for turning said pivot, control means disposed for causing said follower member to turn said pivot shaft and having two cam faces extending along the path of travel of said structure and engageable by said follower member during the forward and return strokes respectively, and two switching members disposed near the respective ends of said path of travel for switching said follower member from one to the other cam surface.

2. A device for deriving translational motion from a source of rotary power, comprising a rotor shaped as a body of revolution with a substantially straight generatrix and being revolvable about its geometric axis, a structure movable along said rotor, a pivot journalled on said structure to be revolvable about a pivot axis extending substantially at a right angle to said generatrix, a friction roller revolvably mounted on said pivot about a roller axis extending at a right angle to said pivot axis, said roller being in frictional engagement with said rotor, a crank member on said pivot for turning the latter, a cam device having two mutually spaced and substantially co-extensive slots engageable by said crank member during the forward and return travel respectively of said structure, said slots extending along the path of travel and communicating with each other at the respective ends of said path, and two switching members mounted near said respective ends and engageable with said crank member for switching it from one to the other slot.

3. A device for deriving translational motion from a source of rotary power, comprising a stationary supporting frame, a rotor revolvable about its geometrical axis relative to said frame, a structure guided on said frame for motion along said rotor, a pivot member revolvably mounted on said structure, a friction roller revolvably mounted on said support pivot member and in frictional engagement with said rotor, a cam follower member on said pivot member for turning said pivot member to control the angular position of the axis of said roller relative to the generatrix of said rotor, a cam device mounted on said frame and having two mutually spaced cam faces extending along said rotor, said follower member being engageable with said cam face during the forward and return strokes of said structure respectively for progessively turning said pivot member as said structure travels along said rotor, two switching members mounted on said cam device near the respective ends of said cam faces and being spring biased and engageable with said follower member for switching the latter from one to the other cam face, and controllable latching means associated with one of said switching members for latching it in a position where it holds said follower member so that said roller axis is parallel to said generatrix.

4. A device for deriving controlled translational motion from a source of rotary power, comprising a stationary supporting frame, an elongated rotor revolvable relative to said frame, a structure guided on said frame for motion along said rotor, a pivot member mounted on said support and being revolvable relative thereto, a friction roller mounted on said pivot member for revolution about an axis at a right angle to that of said pivot member, said roller being in frictional engagement with said rotor and having a cam follower member for turning the axis of said roller at an angle to the direction of the generatrix of said rotor in order to cause said structure to move along said rotor, a cam device having two cam slots extending along said rotor and engageable by said follower member in all travelling positions of said structure, said slots communicating with each other at their respective ends, two switching members pivoted on said cam device near the respective ends of said slots and having respective control surfaces, spring means for biasing said respective members so as to have said control surfaces project into the path of said follower member in order to throw said follower member from one to the other slot as it impinges upon said respective switching members.

5. A shuttle drive, comprising an elongated cylindric rotor revolvable about its cylinder axis, a wheeled carriage movable along said rotor in parallel to said axis and having shuttle engaging means for imparting motion to the shuttle to be driven, a pivot member mounted on said carriage so as to be revolvable relative thereto, a friction roller revolvably mounted on said pivot member and in frictional engagement with the cylindric surface of said rotor, a cam follower forming part of said pivot member for turning it relative to said structure in order to control the angular position of the roller relative to said cylinder axis so that, during revolution of said rotor, said structure remains at rest when said roller axis is parallel to said cylinder axis and is caused to move along said drive member when said roller axis is placed at an angle to said cylinder axis, a cam device having two mutually spaced cam faces extending along said rotor and engaging said cam follower in all travelling positions of said carriage, and two switching means mounted on said cam device near the respective ends of said coextensive slots, said switching means projecting into the path of travel of said cam follower for transferring said follower from one to the other cam face.

6. A shuttle drive, comprising an elongated cylindric rotor revolvable about its cylinder axis, a wheeled carriage movable along said rotor in parallel to said axis and having shuttle engaging means for imparting motion to the shuttle to be driven, a pivot member mounted on said carriage so as to be revolvable relative thereto, a friction roller revolvably mounted on said pivot member and in frictional engagement with the cylindric surface of said rotor, a cam follower forming part of said pivot member for turning it relative to said structure in order to control the angular position of the roller relative to said cylinder axis so that, during revolution of said rotor, said structure remains at rest when said roller axis is in parallel to said cylinder axis and is caused to move along said drive member when said roller axis is placed at an angle to said cylinder axis, a cam device having two mutually spaced cam faces extending along said rotor and engaging said cam follower in all travelling positions of said carriage, two switching members pivoted on said cam device near the respective ends of said slots and having a control surface, spring means disposed between said cam device and said respective switching members for biasing said switching member so that said control surfaces project into the path of said follower in order to throw it from one to the other cam face when said carriage reaches either end of its travel, a latching device engageable with one of said switching members for holding it in position to arrest said carriage, and electromagnetic control means associated with said latching device for releasing said one switching member.

CLINTON R. HANNA.
STANLEY J. MIKINA.

REFERENCES CITED

The following references are of record in the file of this patent:

UNITED STATES PATENTS

| Number | Name | Date |
|---|---|---|
| 2,215,678 | Weathers | Sept. 24, 1940 |
| 2,382,105 | Sarver | Aug. 14, 1945 |
| 2,428,807 | Mikina | Oct. 14, 1947 |